(12) United States Patent
Jenkins et al.

(10) Patent No.: US 7,689,075 B2
(45) Date of Patent: Mar. 30, 2010

(54) OPTICAL WAVELENGTH DIVISION MULTIPLEXER/DEMULTIPLEXER DEVICE

(75) Inventors: Richard M Jenkins, Malvern (GB); Mark E McNie, Malvern (GB)

(73) Assignee: QinetiQ Limited, London (GB)

( * ) Notice: Subject to any disclaimer, the term of this patent is extended or adjusted under 35 U.S.C. 154(b) by 292 days.

(21) Appl. No.: 10/549,817

(22) PCT Filed: Mar. 17, 2004

(86) PCT No.: PCT/GB2004/001122

§ 371 (c)(1),
(2), (4) Date: Sep. 19, 2005

(87) PCT Pub. No.: WO2004/083923

PCT Pub. Date: Sep. 30, 2004

(65) Prior Publication Data

US 2006/0177177 A1  Aug. 10, 2006

(30) Foreign Application Priority Data

Mar. 22, 2003 (GB) ............................... 0306634.7

(51) Int. Cl.
G02B 6/26 (2006.01)
G02B 6/32 (2006.01)
G02B 6/42 (2006.01)
G02B 27/14 (2006.01)
H04J 14/00 (2006.01)
H04J 14/02 (2006.01)

(52) U.S. Cl. .................... 385/33; 385/16; 385/50; 359/634; 398/48; 398/68; 398/88

(58) Field of Classification Search .................... 385/33, 385/16, 50; 398/48, 68, 88; 359/634
See application file for complete search history.

(56) References Cited

U.S. PATENT DOCUMENTS 4,068,920 A * 1/1978 Bass et al. ................... 385/125
4,453,803 A * 6/1984 Hidaka et al. ............... 385/125

(Continued)

FOREIGN PATENT DOCUMENTS

DE  35 42 614   6/1987

(Continued)

OTHER PUBLICATIONS

Miura, Toru et al. "Modeling and Fabrication of Hollow Optical Waveguide for Photonic Integrated Circuits", Jul. 2002, The Japan Society of Applied Physics, vol. 41, pp. 4785-4789.*

(Continued)

*Primary Examiner*—Frank G Font
*Assistant Examiner*—Jerry Blevins
(74) *Attorney, Agent, or Firm*—Nixon & Vanderhye P.C.

(57) ABSTRACT

An optical wavelength division multiplexer/demultiplexer device is described that comprises a substrate having a plurality of wavelength selecting filters. The filters are arranged to provide conversion between a combined beam comprising a plurality of wavelength channels and a plurality of separate beams each comprising a subset of said plurality of wavelength channels. Hollow core waveguides are formed in said substrate to guide light between the wavelength selecting filters. An add/drop multiplexer is also described.

20 Claims, 2 Drawing Sheets

U.S. PATENT DOCUMENTS

| | | | |
|---|---|---|---|
| 5,428,698 A | | 6/1995 | Jenkins et al. |
| 6,002,514 A | | 12/1999 | Baxter et al. |
| 6,097,517 A | * | 8/2000 | Okayama ........................ 398/1 |
| 6,101,210 A | * | 8/2000 | Bestwick et al. ............... 372/96 |
| 6,163,643 A | | 12/2000 | Bergmann et al. |
| 6,219,470 B1 | * | 4/2001 | Tu ............................... 385/14 |
| 6,315,462 B1 | | 11/2001 | Anthamatten et al. |
| 6,501,869 B1 | | 12/2002 | Athale |
| 2002/0102059 A1 | | 8/2002 | Cho |
| 2002/0191907 A1 | * | 12/2002 | Kinoshita et al. ............. 385/24 |
| 2003/0027370 A1 | | 2/2003 | Helin |
| 2003/0035613 A1 | | 2/2003 | Huber et al. |

FOREIGN PATENT DOCUMENTS

| | | |
|---|---|---|
| EP | 0 043 475 A1 | 1/1982 |
| EP | 0 128 800 A1 | 12/1984 |
| EP | 0 221 288 A1 | 5/1987 |
| EP | 0718657 | 6/1996 |
| GB | 2 014 752 A | 8/1979 |
| GB | 2 189 621 | 10/1987 |
| GB | 2 193 816 A | 2/1988 |
| WO | 01/38921 | 7/2000 |
| WO | 01/59492 | 10/2000 |
| WO | 00/75503 | 12/2000 |
| WO | 01/86825 A2 | 11/2001 |
| WO | 02/31551 A1 | 4/2002 |
| WO | 03/065091 A2 | 8/2003 |

OTHER PUBLICATIONS

International Search Report of PCT/GB2004/001213, mailed Jul. 21, 2004.

GB Search Report of GB 0306638.8 of May 13, 2003.

Patent Abstracts of Japan, vol. 21, No. 21, Oct. 12, 1978, JP 53 087746 A, Aug. 2, 1978.

Miura et al., "Hollow Optical Waveguide For Temperature-Insensitive Photonic Integrated Circuits", Japanese Journal of Applied Physics, Publication Office Japanese Journal of Applied Physics, vol. 40, No. 7A, Part 2, Jul. 1, 2001, pp. L688-L690, XP001077922.

Wood et al., "MEMS 2D Matrix Switch", 2002, Mar. 17, 2002, pp. 91-92, vol. 1, XP002286382.

Patent Abstracts of Japan, JP 3025815A, Feb. 4, 1991.

Li et al., "Advanced fiber optical switches using deep RIE (DRIE) fabrication", Sensors and Actuators A, 2003, vol. 102, No. 3, pp. 286-295, XP004399072.

Miura et al., "Modeling and Fabrication of Hollow Optical Waveguide for Photonic Integrated Circuits", Japanese Journal of Applies Physics, vol. 41, No. 7B, Part 1, Jul. 2002, pp. 4785-4789.

Takahashi et al., "Transmission Characteristics of Arrayed Waveguide N×N Wavelength Multiplexer", Journal of Lightwave Technology, IEEE, vol. 13, No. 3, Mar. 1, 1995, pp. 447-455, XP000509310.

Jenkins et al., "An Integrated Optic Approach to 10/spl mu/m LIDAR", Conference on Lasers and Electro-optics in Europe, Sep. 14, 1998, pp. 389-389, XP010617541.

* cited by examiner

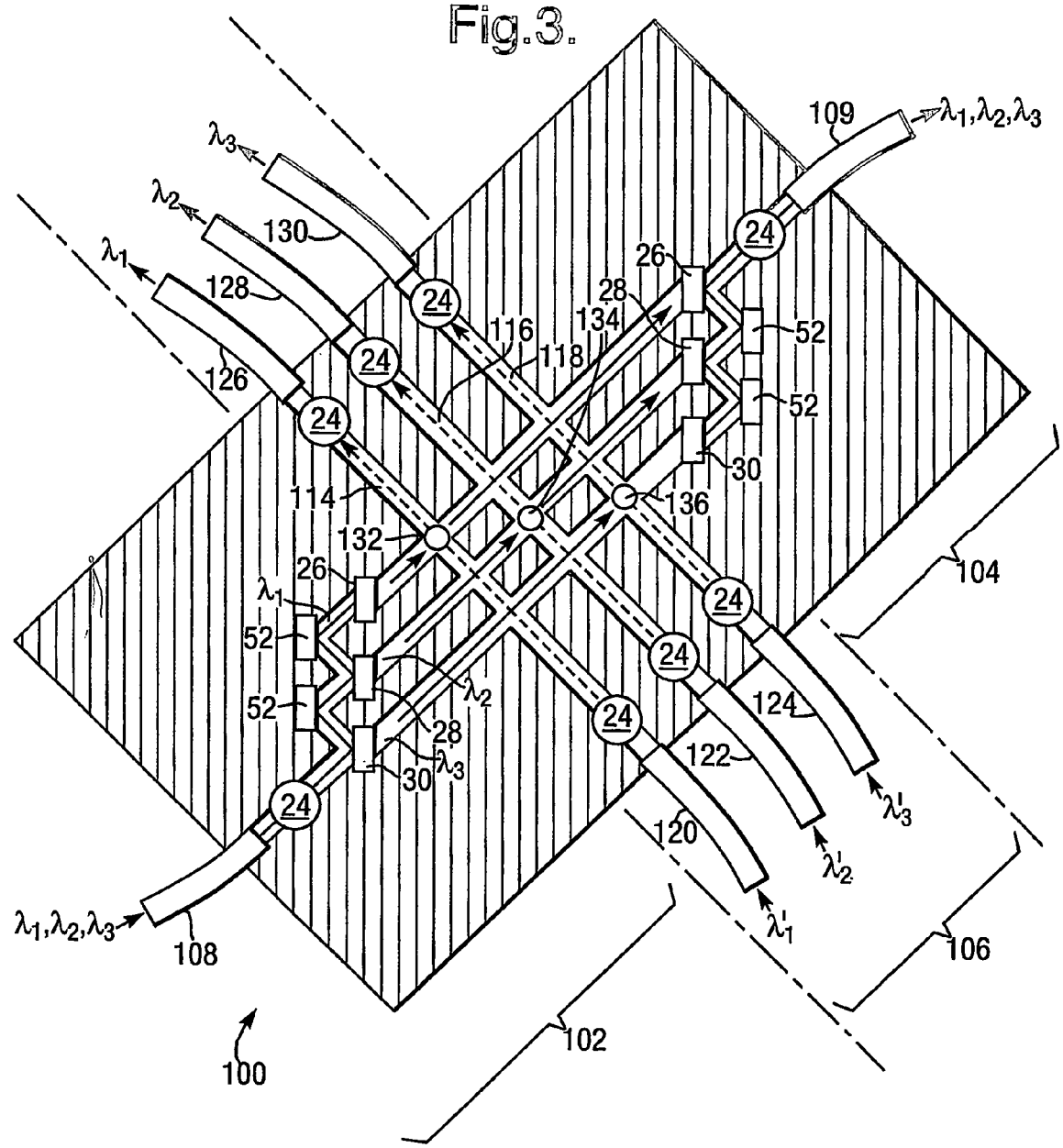

OPTICAL WAVELENGTH DIVISION MULTIPLEXER/DEMULTIPLEXER DEVICE

This application is the US national phase of international application PCT/GB2004/001122 filed 17 Mar. 2004 which designated the U.S. and claims benefit of GB 0306634.7, dated 22 Mar. 2003, the entire content of which is hereby incorporated by reference.

This invention relates to an optical wavelength division multiplexer/demultiplexer device, and to various devices incorporating such a wavelength division multiplexer/demultiplexer device.

Optical fibre based telecommunication and data networks are commonplace. In order to maximise the bandwidth of each optical fibre link, it is known to transmit a number of data carrying light beams of slightly different wavelength through a single optical fibre cable. Typically each wavelength is generated separately, for example by a solid state laser, and modulated to carry the required digital data signal. The different wavelength channels are then combined in a multiplexer before being coupled into the optical fibre.

To extract each of the various light beams of different wavelength from a combined beam, a demultiplexer is used. The signal carried by each beam can thus be separately detected allowing the digital data to be extracted, or each beam can be separately acted upon (e.g. amplified, attenuated, re-routed etc). Typically a demultiplexer is identical in construction to a multiplexer; the demultiplexer simply being a multiplexer device operated in reverse.

One known type of wavelength division multiplexer comprises a cascade of spectral filters. Each spectral filter has different transmission/reflection characteristics and will only transmit light within a given wavelength band. Multiple wavelength component signals are built up by reflecting light comprising wavelengths outside the transmission band from one side of a filter, whilst also passing light within the transmission band through the filter in a direction such that it coincides with the direction of propagation of the reflected light. In this manner, optical signals comprising multiple wavelength components can be constructed. Typically, the components forming the multiplexer are aligned with respect to one another in adjustable mounts or are actively aligned prior to fixing. Light then propagates between the components in free space.

A number of disadvantages are associated with known multiplexer devices of the type described above. For example, the spectral properties of thin film filters are inherently strongly dependent on the angle of incidence of light. Therefore, the filters require precise angular alignment with respect to the incident light or their wavelength dependent transmission/reflection characteristics will be degraded resulting in optical leakage. In the case of a multiplexer, angular alignment of the filters is also important to ensure that the propagation paths of different wavelength signals are truly co-incident after combination to enable efficient coupling into any output optical fibre. The compounded effect of angular misalignment down the filter cascade greatly increases the filter angular alignment accuracy that is required. To achieve the required filter alignment accuracy, the optical components of a multiplexer device are typically adjusted during assembly to ensure the alignment is optimised; this can prove time consuming, complex and costly. In addition, the free space propagation of light can lead to beam diffraction effects that reduce the overall optical efficiency of the device. Mechanical shock and/or thermal effects can also lead to degradation of component alignment over time.

It is an object of the present invention to mitigate at least some of the disadvantages described above.

According to a first aspect of the present invention, an optical wavelength division multiplexer/demultiplexer device comprises a substrate having a plurality of wavelength selecting filters, said filters being arranged to provide conversion between a combined beam comprising a plurality of wavelength channels and a plurality of separate beams each comprising a subset of said plurality of wavelength channels, characterised in that hollow core waveguides are formed in said substrate to guide light between the wavelength selecting filters.

The guiding of light within hollow core waveguides is advantageous as it reduces beam divergence and cross-talk effects within the device. The present invention thus provides a multiplexer or demultiplexer having a greater optical efficiency than known devices in which light propagates between wavelength selecting filters in free space. The guiding of light though the device also ensures that beam diffraction effects do not reduce the efficiency with which light can be coupled into optical fibres as it exits the device.

The term wavelength channel as used herein means a range of wavelengths within a defined wavelength band. Typically, a wavelength channel would be a single wavelength output (e.g. from a solid state laser) having a certain line width. A number of standard wavelength bands are defined by the International Telecommunications Union (ITU). For example, ITU dense wavelength division multiplexing (DWDM) systems use light signals having a 100 GHz frequency separation.

The device, when acting as a demultiplexer, thus splits a beam comprising a set of wavelength channels into a plurality of beams each comprising a subset of these wavelength channels. Each separate beam may comprise only a single wavelength channel, or it may comprise two or more wavelength channels. Similarly, when acting as a multiplexer, the device combines separate beams (each of which may comprises one or more wavelength channels) to form a combined beam that includes all the wavelength channels of the separate beams.

It should be noted that when hollow core optical waveguide structures are produced, the hollow core is likely to fill with air. However, this should be seen in no way as limiting the scope of this invention. The hollow core may contain any fluid (for example a liquid or an inert gas such as nitrogen) or be a vacuum. The term hollow core simply means a core which is absent any solid material. Furthermore, the terms "light" and "optical" are used herein to refer to any electromagnetic radiation having a wavelength from the deep ultraviolet to the far infra-red.

Conveniently, each wavelength selecting filter transmits a single wavelength channel. Alternatively, each wavelength selecting filter advantageously reflects a single wavelength channel. A combination of transmitting and reflecting filters may also be employed.

Advantageously, the wavelength selecting filters comprise thin film optical filters. For example, multi-layer or etalon thin film optical filters. A typical thin film filter will have about a 0.1 nm shift in its central band-pass wavelength if mis-aligned by 1°.

Preferably, the substrate additionally comprises a plurality of alignment slots arranged to receive, in alignment, said optical filters. Alignment slots may be formed in the substrate and appropriately shaped to receive, in alignment, the wavelength selecting filters. The alignment slots may be deeper/shallower and/or wider/narrower than the hollow core optical waveguides as required.

Fabricating alignment slots with sufficient accuracy to align the filter (i.e. so that the alignment slot is arranged to receive the filter in alignment) is especially advantageous. In such a case, placing the filter in the alignment slot inherently aligns the filter with respect to the hollow core waveguide, and hence accurately determines the angle of incidence of light on the filter. A separate filter alignment or adjustment step is therefore not required. Conventional pick and place techniques of the type used in the manufacture of electronic circuits and the like could be used to place the filters in the appropriate alignment slots.

The alignment slots may also advantageously comprise micro-electromechanical system (MEMS) spring clips or clamps to hold the filters or to push the filter into engagement with a reference surface.

Alternatively, pick and place techniques may be used to provide the necessary alignment. For example, a component could be accurately aligned during placement and then fixed (e.g. glued) to remain in alignment.

Preferably the substrate in which said hollow core waveguides and any alignment slots are formed comprises semiconductor material. Semiconductor substrates, such as Silicon, can be etched with good accuracy using micro-fabrication techniques such as deep reactive ion etching. The substrate may advantageously comprise a multiple layer wafer; for example silicon on germanium (SiGe), silicon on sapphire, silicon-on-insulator (SOI) or silicon-on-glass. A person skilled in the art would recognise that micro-fabrication techniques typically involve a lithography step to define a pattern, followed by an etch step to transform the pattern in to one or more layers on, or in, the substrate material. The lithography step may comprise photolithography, x-ray or e-beam lithography. The etch step may be performed using ion beam milling, a chemical etch, a dry plasma etch or a deep dry etch (also termed deep silicon etch). Micro-fabrication techniques of this type are also compatible with various layer deposition techniques such as sputtering, CVD and electro or electro-less plating.

Although substrates that comprise semiconductor material can advantageously be used, the device could also be formed on a variety of alternative substrate. The substrate could advantageously be silicon oxide based; for example formed from quartz, silica or glass. Substrates could also be embossed, or patterns could be lithographically defined in polymer layers. From a manufacturing perspective, it can be advantageous to use batch micro-fabrication techniques.

Advantageously, a base portion and a lid portion are provided to define said hollow core waveguide. Such an arrangement is described in more detail in PCT patent application GB2003/000331 and provides a convenient way to manufacture the device.

Conveniently at least one further hollow core waveguide is provided in the substrate to guide said combined beam and/or said plurality of beams each comprising a subset of said plurality of wavelength channels to/from said plurality of wavelength selecting filters.

Advantageously at least one optical fibre alignment slot is provided in said substrate, said optical fibre alignment slot being arranged to receive an optical fibre in alignment thereby enabling light to be coupled between said optical fibre and said at least one further hollow core waveguide.

In other words, optical fibre alignment slots may be formed in the substrate to receive optical fibres carrying beams to, or from, the hollow core waveguides of the device. In the case of solid core fibres, stepped optical fibre alignment slots may be provided to hold both the buffer layer and the cladding. The alignment of the core of a hollow core optical fibre with the hollow core waveguide of the device may also be achieved; for example by clamping the optical fibre cladding in a alignment slot. The use of hollow core optical fibres would be especially advantageous as the air core to air core connection would be free from any unwanted reflections.

To provide efficient coupling between the core of an optical fibre and a hollow core waveguide of the device, the cross-section of the hollow core waveguide should be appropriate for the cross-section of the optical fibre core. In the case of solid core fibres, leakage into the cladding means that the width of the mode carried by the fibre is actually greater than the core diameter; for example typically the 10 µm solid core of a single mode glass fibre has a total field width of around 14 µm diameter. Fibre ends of solid core fibres may be anti-reflection coated.

If the mode width of the fibre is different to that of the hollow core waveguide, mode matching means such as lenses (e.g. ball or GRIN rod etc) can be conveniently used to couple light between the at least one optical fibre and the at least one further hollow core waveguide. Alternatively, lensed fibres could be used which would remove the requirement for separate lenses.

Preferably, at least one of the hollow core waveguides comprise one or more hybrid or monolithic reflective elements. The provision of reflective elements enables the hollow core waveguides to be formed from a number of waveguide sections which are angled to each other. This enables, for example, beams to be guided through a 90° angle. The provision of such elements thus allows more compact optical circuits to be provided.

Advantageously, at least some of the internal surface of the hollow core waveguides carry a reflective coating. Conveniently, the reflective coating is a layer of metal such as gold, silver or copper. Metals will exhibit a suitably low refractive index over a wavelength range that is governed by the physical properties of the metal; standard text books such as "the handbook of optical constants" by E. D. Palik, Academic Press, London, 1998, provide accurate data on the wavelength dependent refractive indices of various materials. In particular, gold has a refractive index less than that of air at wavelengths within the range of around 500 nm to 2.2 µm; this encompasses wavelengths within the important telecommunications band of 1400 nm to 1600 nm. Copper exhibits a refractive index less than unity over the wavelength range of 560 nm to 2200 nm, whilst silver has similar refractive index properties over a wavelength range of 320 nm to 2480 nm.

A layer of metal may be deposited using a variety of techniques known to those skilled in the art. These techniques include sputtering, evaporation, chemical vapour deposition (CVD) and (electro or electro-less) plating. CVD and plating techniques allow the metal layers to be deposited without significant direction dependent thickness variations. Sputtering using a rotating sample and/or source would also provide even coverage. Plating techniques are especially advantageous as they permit batch (i.e. multi-substrate parallel) processing to be undertaken.

A skilled person would recognise that adhesion layers and/or barrier diffusion layers could be deposited on the hollow core waveguide surfaces prior to depositing the layer of metal. For example, a layer of chrome or titanium could be provided as an adhesion layer prior to the deposition of gold. A diffusion barrier layer, such as platinum, may also be deposited on the adhesion layer prior to gold deposition. Alternatively, a combined adhesion and diffusion layer (such as titanium nitride, titanium tungsten alloy or an insulating layer) could be used.

The reflective coating may also be provided by an all-dielectric, or a metal-dielectric, stack. A person skilled in the art would recognise that the optical thickness of the dielectric layer(s) provides an interference effect that will determine the reflective properties of the coating. The dielectric material may be deposited by CVD or sputtering or reactive sputtering. Alternatively, a dielectric layer could be formed by chemical reaction with a deposited metal layer. For example, a layer of silver could be chemically reacted with a halide to produce a thin surface layer of silver halide.

In other words, the reflective coating may be provided by an all-dielectric, or a metal-dielectric, stack. Semiconductor-dielectric stacks could also be used. A person skilled in the art would recognise that the optical thickness of the dielectric layer(s) gives the required interference effects and thus determines the reflective properties of the coating. The reflective properties of the coating may also be dependent, to some extent, on the properties of the material in which the hollow core waveguides are formed. Hence, the material from which the waveguide is formed may also form a base layer, and be a part of, any such multiple layer dielectric stack.

Conveniently, the hollow core waveguides are dimensioned to support fundamental mode propagation or alternatively to support multi-mode propagation.

If multi-mode hollow core wave guide structures are provided, the device can be dimensioned to allow the re-imaging effect to be exploited. The re-imaging phenomena, and details concerning calculation of the re-imaging distance for a given waveguide, are described in more detail below. In short, the re-imaging effect provides a replication of an input field a certain distance from the injection of such a field into a multi-mode waveguide. Arranging the device so that all the path lengths through the device are multiples of this re-imaging length enables the input field of an input optical fibre to be replicated at any of the optical outputs. This allow efficient coupling of light into an output optical fibre.

Advantageously, portions of the one or more hollow core optical waveguides have a substantially rectangular (which herein shall include square) cross-section. A square, or almost square, cross-section hollow core waveguide provides a waveguide in which the losses are substantially polarisation independent and is preferred when the polarisation state of the light is unknown or varying. Dimensioning the waveguide to have a depth greater than its width, or vice versa, increases polarisation dependent losses, but may be advantageous when the polarisation state of light propagating through the waveguide is known.

Although rectangular cross-section waveguides are convenient, many alternative waveguide shapes could be employed. For example, circular, elliptical or v-shaped waveguides could be provided.

Conveniently, the combined beam comprises at least three, four, eight, sixteen, thirty-two, sixty-four or one hundred and twenty eight wavelength channels.

According to a second aspect of the invention, an optical device comprises a demultiplexer stage comprising a device according to the first aspect of the invention that is arranged to receive a combined beam comprising a plurality of wavelength channels and to separate said combined beam into a plurality of beams each comprising a single wavelength channel, and a multiplexer stage comprising a device according to the first aspect of the invention that is arranged to receive a plurality of beams each comprising a single wavelength channel and to combine said plurality of beams to produce a combined beam comprising a plurality of wavelength channels, wherein one or more of the plurality of beams produced by the demultiplexer stage are routed to the multiplexer stage via an optical processing means.

The use of a multiplexer and demultiplexer with an intermediate optical processing stage provides a device that can be used for extracting and acting separately on one or more wavelength channels in a combined beam that has a plurality of wavelength channels. The optical processing means may be formed in the substrate used to provide the multiplexer and demultiplexer stages, and may conveniently comprise components connected by hollow core optical waveguides. Forming the whole of the optical device in a common substrate reduces manufacturing complexity and cost.

Conveniently, the optical processing means comprise at least one optical amplifier, for example an erbium doped fibre amplifier (EDFA). In this way the power of one or more individual wavelength channels could be increased; for example so that the device has a net zero optical loss. It would be appreciated that attenuators (e.g. variable optical attenuators) could be provided to reduce optical power of a channel if required.

Advantageously, the optical processing means comprise an optical routing means thereby enabling the device to be used as an optical router. The optical routing means may be of a fixed configuration (thereby making the optical router "hard-wired") or it may be re-configurable.

One or more additional wavelength channels may advantageously be received by said optical routing means, said optical routing means being arranged to route at least some of said additional wavelength channels to said multiplexer stage. In this way, channels may be added to and/or dropped from a combined beam. Channels dropped from a combined beam may subsequently be coupled into a second combined beam. Complex routing devices can thus be constructed using a single substrate.

The optical routing means may advantageously comprise a matrix switch. For example, a two dimensional matrix switch of the type described in the co-pending international patent application which claims priority from GB patent application 0306638.8 (Agent's reference P7254/AA) may be used.

Conveniently, the matrix switch comprises an array of micro-electro-mechanical systems (MEMS) activated components. Herein, MEMS is taken to include micro-machined elements, micro-systems technology, micro-robotics and micro-engineering and the like. The MEMS component may advantageously comprise an electro-thermal actuation mechanism (e.g. a bent beam arrangement) to provide large throw (e.g. 5-100 μm full scale deflection) actuation. Alternative actuation mechanisms such as electromagnetic, electrostatic (e.g comb drive), bimorph or piezoelectric may also be used. More detail on MEMS device actuation technologies and the associated fabrication techniques can be found in "Fundamental of Microfabrication" by Marc Madou, published by CRC Press (Boca Raton) in 1997; ISBN 0-8493-9451-1.

According to a third aspect of the invention, a substrate for an optical wavelength division multiplexer/demultiplexer device comprises a plurality of alignment slots for receiving a plurality of wavelength selecting filters and hollow core waveguides to guide light between said alignment slots wherein the arrangement provides, when appropriate wavelength selecting filters are located in said alignment slots, conversion between a combined beam comprising a plurality of wavelength channels and a plurality of beams comprising a single wavelength channel.

The invention will now be described, by way of example only, with reference to the following drawings in which;

FIG. 3 shows an add/drop multiplexer device of the present invention.

Figure 1:
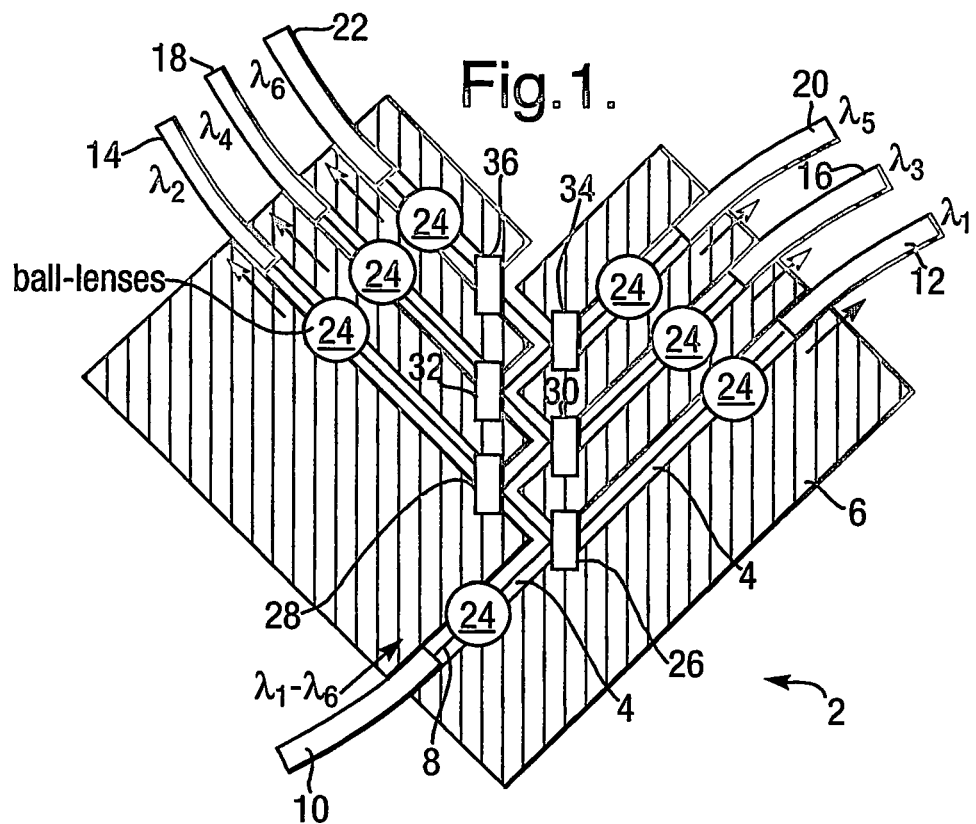
FIG. 1 shows a multiplexer of the present invention.

Referring to FIG. 1, a multiplexer 2 according to the present invention is shown. The multiplexer 2 comprises a hollow core optical waveguide structure 4 having a rectangular cross-section formed in a silicon-on-insulator (SOI) substrate 6 by deep reactive ion etching. The multiplexer is arranged to receive a combined light beam 8, comprising six component light beams of wavelength $\lambda_1$ to $\lambda_6$, from a single mode input optical fibre 10. A first output fibre 12, a second output fibre 14, a third output fibre 16, a fourth output fibre 18, a fifth output fibre 20 and a sixth output fibre 22 are provided to receive the six output beams having wavelengths $\lambda_1$ to $\lambda_6$ respectively. Ball lenses 24 are also provided to couple light between the hollow waveguide structure 4 and the input fibre 10 and each of the output fibres 12 to 22.

The substrate also comprises alignment slots in which a first filter 26, a second filter 28, a third filter 30, a fourth filter 32, a fifth filter 34 and a sixth filter 36 are located. The first to sixth filters 26 to 36 are thin film filters having spectral characteristics that permit the transmission of light of wavelengths $\lambda_1$ to $\lambda_6$ respectively; any wavelength outside the specified filter wavelength being substantially reflected by the filter.

In use, the combined light beam 8 received from the input fibre 10 is coupled into the hollow core optical waveguide structure 4 and directed to the first filter 26. The first filter 26 transmits light having the wavelength $\lambda_1$ and reflects all other wavelengths of light (i.e. the beams of wavelength $\lambda_2$ to $\lambda_6$). The light beam component $\lambda_1$ is then guided, and coupled into, the first output fibre 12 whilst the remaining components of the combined light beam (i.e. $\lambda_2$ to $\lambda_6$) are guided to the second filter 28. The second filter 28 transmits light having the wavelength $\lambda_2$ and reflects all other wavelengths (i.e. $\lambda_3$ to $\lambda_6$). The light beam component $\lambda_2$ is then guided, and coupled into, the second output fibre 14 whilst the remaining components of the combined light beam (i.e. $\lambda_3$ to $\lambda_6$) are guided to the third filter 30. This selective transmission/reflection is repeated for the fourth, fifth and sixth filters and results in light beams of wavelength $\lambda_1$ to $\lambda_6$ being coupled in to the first to sixth output fibres 12-22 respectively.

As described above, the provision of the hollow core waveguide structure reduces optical losses that are associated with free space propagation. The hollow core waveguide structure also ensures the combined light beam propagates along a common optical path. Furthermore, defining alignment slots in the substrate for the spectral filters using the same process used to form the hollow core waveguide ensures that the filters are accurately aligned (e.g. at 45°) with respect to the direction of light propagation in the waveguide; this maximises the efficiency of the filters.

It should be noted that the device described above is strictly operating as a demultiplexer. However, the device could equally be operated in reverse to combine six light beams of different wavelength to form a combined light beam.

Figure 2:
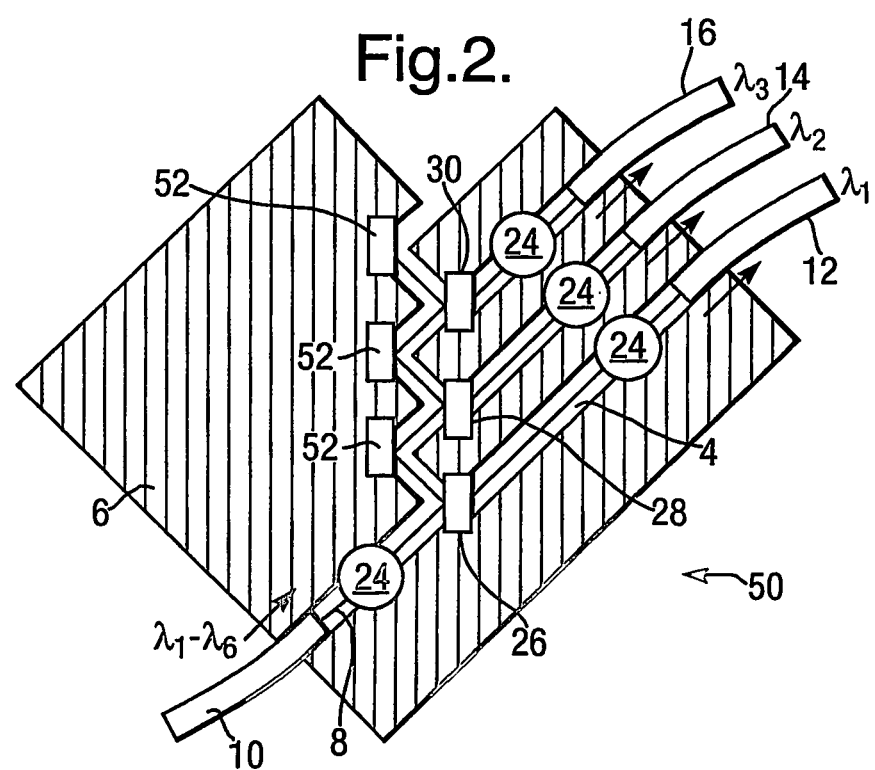
FIG. 2 shows part of a further multiplexer of the present invention.

The device described with reference to FIG. 1 thus provides a compact multiplexer realisation. However, in some circumstances it is useful for the optical fibres carrying the single component beams to be laterally separated along one side of the multiplexer device. FIG. 2 illustrate an implementation of such a configuration.

Referring to FIG. 2, a portion of an alternative multiplexer 50 according to the present invention is shown. In common with the device described with reference to FIG. 1, the multiplexer 50 is arranged to receive a combined light beam 8, comprising six component light beams of wavelength $\lambda_1$ to $\lambda_6$, from a single mode input optical fibre 10. A first output fibre 12, a second output fibre 14, a third output fibre 16, and fourth to sixth output fibres (not shown) are also provided to receive the six separated output beams having wavelengths $\lambda_1$ to $\lambda_6$ respectively. Ball lenses 24 are provided to couple light between the hollow waveguide structure 4 and the input fibre 10 and each of the output fibres. The substrate 6 in which the multiplexer is formed also comprises alignment slots in which a first filter 26, a second filter 28, a third filter 30 and fourth to sixth filters (not shown) are located.

The optical path within the multiplexer 50 differs from that shown in FIG. 1 so that each of the output fibres can be laterally displaced along a common axis. In order to provide such a configuration, mirrors 52 are located within the waveguide structure in-between each of the filters to direct the combined beam through a ninety degree angle. In this way, the required angle of incidence of light on the filters (45° in this case) can be retained.

FIG. 2 illustrates just one possible modification to the hollow core waveguide structure of the multiplexer. A skilled person would appreciate that numerous adjustments to the structure would be possible. For example, the hollow core waveguide between filters could be routed through any angle; this could be achieved not only by reflection from mirrored surfaces, but in a variety of ways such as providing curved hollow core waveguide structures.

Referring to FIG. 3, a routing device 100 is shown that incorporates a demultiplexer/multiplexer arrangement to provide a re-configurable optical add-drop multiplexer (ROADM). The routing device 100 includes a demultiplexer stage 102 and a multiplexer stage 104. An intermediate optical switching stage 106 is also provided between the demultiplexer and multiplexer stages.

The demultiplexer stage 102 comprises a three-way demultiplexer device. The demultiplexer comprises a first filter 26, a second filter 28, a third filter 30 and a pair of mirrors 52. The filters and mirrors are held in alignment slots formed in a silicon substrate, and are inter-connected by hollow core waveguides in the manner described with reference to FIG. 2 above. An input fibre 108 is also provided to couple a three component ($\lambda_1$-$\lambda_3$) light beam into the demultiplexer stage. The three spatially separated component beams are output from the stage via three separate hollow core optical waveguides.

The multiplexer stage 104 comprises a three-way multiplexer device. It includes a first filter 26, a second filter 28, a third filter 30 and two mirrors 52. The filters and mirrors are held in alignment slots formed in a silicon substrate, and are inter-connected by hollow core optical waveguides in the manner described with reference to FIG. 2 above. Each of the three waveguides carrying a component beam from the demultiplexer stage 102 are optically coupled, via the intermediate stage, to a corresponding input waveguide of the multiplexer stage 104. A first output fibre 109 is also provided to receive the combined beam produced by the multiplexer stage.

The intermediate optical switching stage 106 provides the add/drop functionality, and comprises a first feed hollow core waveguide 114, a second feed hollow core waveguide 116 and a third feed hollow core waveguide 118. Each of the hollow core feed waveguides are arranged to orthogonally intersect the hollow core waveguides guiding light from the demultiplexer stage 102 to the multiplexer stage 104. The intermediate optical switching stage 106 also comprises second, third and fourth input fibers (120, 122 and 124) connected to one end of each of the first, second and third feed hollow core waveguides respectively. The second end of each feed waveguide is also connected to second, third and fourth output fibers (126, 128 and 130) respectively. All the optical fibres are coupled to the hollow core waveguide via ball lenses 24.

A first reflective switch 132 is located in the feed optical waveguide 114 at the point at which it intersects the waveguide that is arranged to carry light of wavelength $\lambda_1$ from the demultiplexer stage to the multiplexer stage. A second reflective switch 134 is located in the second feed waveguide 116 at the point where it intersects the waveguide that is arranged to carry light of wavelength $\lambda_2$ from the demultiplexer stage to the multiplexer stage. A third reflective switch 136 is located in the third feed waveguide 118 at the point where it intersects the waveguide that is arranged to carry light of wavelength $\lambda_3$ from the demultiplexer stage to the multiplexer stage. Each reflective switch is angled at 45° to the propagation direction of light in the waveguides. The reflective element is reflective on both of its surfaces.

The reflective switches may comprise any type of MEMS actuated switch; e.g. pop-up mirrors or moveable reflective shutters. In place of switches having two reflective faces to provide the add and drop routing function, it would also be possible to use two separate switches to provide the drop and add functions. It should also be noted that although a re-configurable routing device is described herein, the switch could actually be permanently set in a single position; i.e. a hard wired or fixed add/drop function could be implemented.

In use, a three component ($\lambda_1$-$\lambda_3$) combined light beam is coupled into the demultiplexer stage from the first input optical fibre 108. The three wavelength components are spatially separated, and each is passed along a separate hollow core waveguide to the switching stage 106. If each of the reflective switches are retracted, light simply passes from the demultiplexer stage to the multiplexer stage and is recombined.

However, activation of a reflective switch causes the relevant wavelength channel from the first input optical fibre 108 to be re-routed to the second, third or fourth output fibre as appropriate. In place of this dropped wavelength channel, the wavelength channel from the second, third or fourth input fibre, as appropriate, is added to the combined beam. In this way, the device can exchange any of the light beams of wavelength $\lambda_1$ to $\lambda_3$ in the combined beam with the light carried by the second, third and fourth optical fibres 120, 122 and 124 respectively.

The intermediate switching stage of the device described with reference to FIG. 3 provides a simple means of adding and/or dropping wavelength components of a multiple component beam. A skilled person would appreciate how devices could be provided in accordance with the teachings contained herein to provide more complex add/drop functions. For example, multiple demultiplexer and multiplexer stages could be used in combination with a high complexity optical matrix switch to provide higher order add/drop functions.

The intermediate switching stage may also comprise semiconductor lasers and/or modulators to produce the replacement beams carried by the second, third or fourth input fibres 120, 122 and 124. Similarly, detectors could be provided to convert the optical signals of the second, third and fourth output fibres into electrical outputs. Various amplifier and attenuator elements could also be added; for example to make the device a zero-loss component.

Any multiplexer/demultiplexer devices of the type described above may be dimensioned to exploit the so-called "re-imaging" phenomena that is found with multi-mode waveguides. The re-imaging effect is described in more detail elsewhere; for example see PCT patent application GB2003/000331. In short, it has been found that multi-mode waveguides (in particular those with a rectangular cross-section) can be designed to provide re-imaging of symmetric, anti-symmetric or asymmetric optical fields of a given wavelength by designing the length of the waveguide to have an appropriate relationship to its width and depth. In other words, the Gaussian input profile of an input beam is re-imaged (i.e. reproduced) after propagating a certain distance along a given waveguide. This effect also gives rise to beam replication; i.e. multiple images of the beam being formed at distances shorter than the re-imaging length. These effects have been described previously in U.S. Pat. No. 5,410,625 and provides the basis for multi-mode interference (MMI) beam splitting devices.

As an example, consider a symmetric field in a square sectioned waveguide. This will have a re-imaging length that is given by the square of the waveguide width over the wavelength of the propagating radiation. Re-imaging of the symmetric field occurs at the re-imaging length and multiples of the re-imaging length. For the case of a 50.0 µm wide hollow waveguide and 1.55 µm radiation, the re-imaging length is thus 1.613 mm. The symmetric field would be re-imaged at this length and also at integer multiples of this length, i.e. 3.23 mm, 4.84 mm etc. For example, a $TEM_{00}$ Gaussian input beam from a single mode optical fibre could be re-imaged at distances of 1.613 mm.

Alternatively, for the case of an asymmetric optical field, re-imaging occurs at eight times the length required for symmetric field re-imaging, i.e. at 12.09 mm for a 50.0 µm wide hollow waveguide. A mirror image of the asymmetric field is also formed at half this length i.e. at 6.05 mm. In particular, offsetting the input from the centre line of the multimode region provides an asymmetric input that is re-imaged at pre-determined distances along the guide at an equivalent offset on either side of the centre line.

In the case of a rectangular waveguide where the depth and width of the waveguide are substantially different, the re-imaging lengths associated with the two waveguide cross-sectional dimensions (e.g. depth and width) are themselves different. However, by arranging that the relationship between the dimensions of the rectangular hollow waveguide is such that re-imaging is produced at identical lengths for the particular width and depth, any field can be re-imaged. Thus, a symmetric field can be re-imaged in a hollow rectangular waveguide by arranging that the re-imaging lengths associated with axes of width $w_1$ and $w_2$ to be identical.

The optical path length from an input fibre to the associated output fibre(s) in a device described above could thus be arranged to correspond to the re-imaging distance (or a multiple thereof). Furthermore, the reflective switches in the device described with reference to FIG. 3 above could be arranged to lie at re-imaging points.

Using an arrangement that employs the re-imaging effect has the advantage that collimating means (e.g. ball lenses 24) are not required in order to couple light between the hollow core waveguides and the associated optical fibres. Furthermore, placing each MEMS switch at a re-imaging distance further reduces the acceptable angular alignment tolerances of the MEMS components. The use of the re-imaging effect also reduces diffraction losses where the waveguide has to be broken in order to facilitate the location of a moveable reflective element.

Finally, it should be noted that although light is incident on the spectral filters described with reference to the above figures at 45° this should not be seen as limiting the scope of the invention. The angle of the hollow core waveguides with respect to the spectral filters can be chosen to direct light to the filter at the filter's designed angle of incidence. Furthermore, it would be appreciated by the skilled person that the angle of incidence may be different for filters having different spectral characteristics.

The invention claimed is:

1. An optical wavelength division multiplexer/demultiplexer device comprising:
a substrate having a plurality of wavelength selecting filters, said filters being arranged to provide conversion between a combined beam comprising a plurality of wavelength channels and a plurality of separate beams each comprising a subset of said plurality of wavelength channels, and
hollow core waveguides are formed in said substrate to guide light between the wavelength selecting filters.

2. A device according to claim 1 wherein each of said plurality of wavelength selecting filters transmit a single wavelength channel.

3. A device according to claim 1 wherein the wavelength selecting filters comprise thin film optical filters.

4. A device according to claim 1 wherein the substrate additionally comprises a plurality of alignment slots arranged to receive, in alignment, said optical filters.

5. A device according to claim 4 wherein said alignment slots comprise micro-electro-mechanical system (MEMS) structures to provide said alignment.

6. A device according to claim 1 wherein the substrate comprises at least one of a semiconductor material, silicon, silicon-on-insulator (SOI) and a silicon oxide based material.

7. A device according to claim 1 wherein a base portion and a lid portion are provided to define said hollow core waveguide.

8. A device according to claim 1 wherein at least one further hollow core waveguide is provided in the substrate to guide said combined beam and/or said plurality of separate beams each comprising a subset of said plurality of wavelength channels to/from said plurality of wavelength selecting filters.

9. A device according to claim 8 wherein at least one optical fibre alignment slot is provided in said substrate, said optical fibre alignment slot being arranged to receive an optical fibre in alignment thereby enabling light to be coupled between said optical fibre and said at least one further hollow core waveguide.

10. A device according to claim 9 wherein a mode matcher is provided to couple light between the at least one optical fibre and the at least one further hollow core waveguide.

11. A device according to claim 10 wherein the mode matcher comprises at least one of a ball lens and a GRIN lens.

12. A device according to claim 1 wherein at least one of the hollow core waveguides comprise at least one reflective element.

13. A device according to claim 1 wherein the hollow core waveguides are dimensioned to support fundamental mode propagation.

14. A device according to claim 1 wherein the hollow core waveguides are dimensioned to support multi-mode propagation and said wavelength selecting filters are spaced apart by the re-imaging distance.

15. A device according to claim 1 wherein said hollow core waveguides have a substantially rectangular cross section.

16. A device according to claim 1 wherein the combined beam comprises at least three wavelength channels.

17. An optical device comprising a demultiplexer stage comprising first and second devices according to claim 1, wherein said first device is arranged to receive a combined beam comprising a plurality of wavelength channels and to separate said combined beam into a plurality of beams each comprising a subset of said plurality of wavelength channels, and a multiplexer stage, wherein said second device is arranged to receive a plurality of beams each comprising a subset of said plurality of wavelength channels and to combine said plurality of beams to produce a combined beam comprising a plurality of wavelength channels, wherein at least one of the plurality of beams produced by the demultiplexer stage are routed to the multiplexer stage via an optical processor.

18. A device according to claim 17 wherein the optical processor comprises at least one of an optical amplifier and a matrix switch.

19. A device according to claim 17 wherein the optical processor comprises a matrix switch and at least one additional wavelength channel is received by said matrix switch, said matrix switch being arranged to route said at least one additional wavelength channel to said multiplexer stage.

20. A substrate for an optical wavelength division multiplexer/demultiplexer device comprising a plurality of alignment slots for receiving a plurality of wavelength selecting filters and hollow core waveguides to guide light between said alignment slots wherein the arrangement provides, when appropriate wavelength selecting filters are located in said alignment slots, conversion between a combined beam comprising a plurality of wavelength channels and a plurality of beams comprising a single wavelength channel.

* * * * *